(No Model.)  2 Sheets—Sheet 1.

F. B. TAIT.
CORN SHELLER.

No. 605,934. Patented June 21, 1898.

ATTEST
Nora Graham
Ina C. Graham

INVENTOR.
F. B. TAIT.
by L. P. Graham
his attorney

THE NORRIS PETERS CO., PHOTO-LITHO., WASHINGTON, D. C.

(No Model.)
F. B. TAIT.
CORN SHELLER.
No. 605,934.  Patented June 21, 1898.
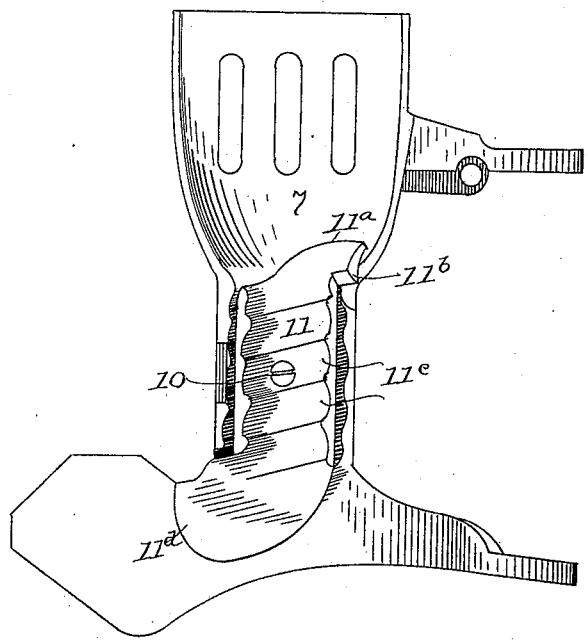
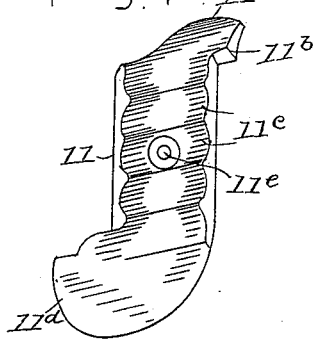
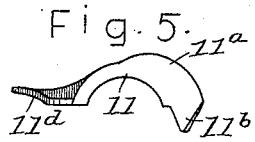
ATTEST
Nora Graham
Ina C. Graham
INVENTOR
F. B. TAIT.
by L. P. Graham
his attorney

UNITED STATES PATENT OFFICE.

FELIX B. TAIT, OF DECATUR, ILLINOIS.

CORN-SHELLER.

SPECIFICATION forming part of Letters Patent No. 605,934, dated June 21, 1898.

Application filed August 18, 1897. Serial No. 648,705. (No model.)

*To all whom it may concern:*

Be it known that I, FELIX B. TAIT, of Decatur, in the county of Macon and State of Illinois, have invented certain new and useful Improvements in Corn-Shellers, of which the following is a specification.

This invention relates to hand corn-shellers, and it is intended to provide means whereby a sheller built to shell field-corn may be easily converted into a sheller for pop-corn.

The invention is exemplified in the structure hereinafter described, and it is defined in the appended claim.

Figure 1:
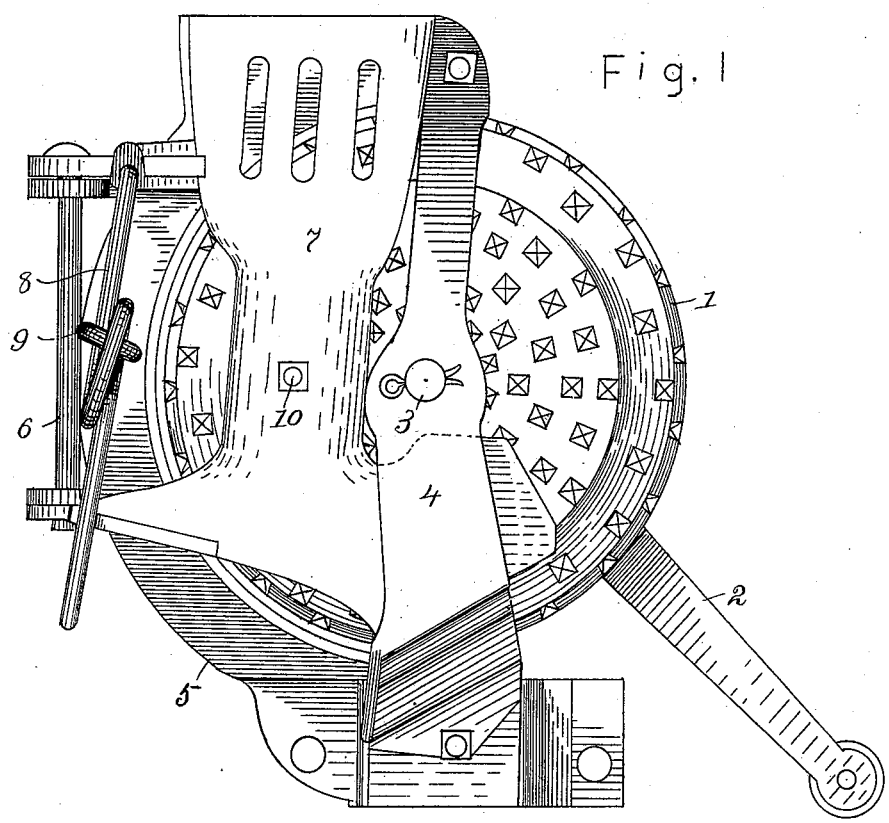
Figure 2:
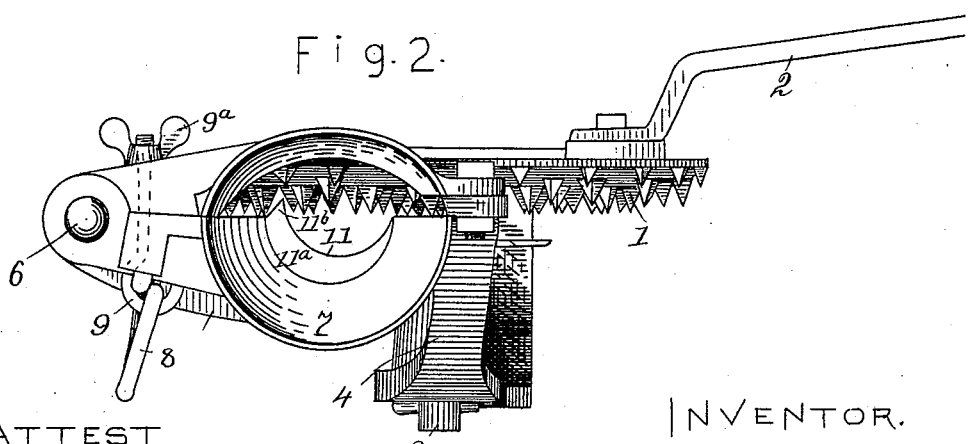

In the drawings forming part of this specification, Figure 1 is a side elevation of a sheller to which my attachment is applicable. Fig. 2 is a plan of the sheller shown in elevation in Fig. 1. Fig. 3 is an elevation of the inner surface of the concave of the sheller with my attachment connected therewith. Fig. 4 is an elevation of the attachment, showing the inner surface thereof. Fig. 5 is a plan showing the configuration of the attachment as viewed from above.

The type of sheller to which my improvement is applicable is that in which a vertical concave is opposed to a toothed disk, and such sheller is represented in a preferred form in the drawings herewith accompanying, in which the toothed disk is shown at 1 and the concave at 7. The disk is provided with a handle 1, by means of which it is rotated, and its shaft 3 journals in a boss in an upright member 4 of the frame. A pin 6 extends through the lugs in a semicircular member 5 of the frame, and on such pin the lugs of the concave 7 are pivoted. A spring-rod 8 extends from one lug of the concave to the other. A hooked bolt 9 engages the spring-rod and extends through a hole in member 5 of the frame, and a thumb-nut $9^a$ is screwed onto the protruding end of the bolt. The bolt and the nut provide means for drawing the concave toward the disk to any desired extent, and the spring-rod permits the concave to yield when an unusually large ear is inserted or any other circumstance requires such action.

The concave is corrugated transversely throughout its operative portion, and the operation of the device consists in placing an end of an ear of corn into the hopper portion of the concave and turning the disk in a direction to force the ear downward while turning it around and shelling the corn off the cob. When the upper end of the stripped cob reaches the lower end of the concave, the action of the disk turns the cob into an approximately horizontal position and discharges it upper end foremost from a side of the lower portion of the disk. The concave has sufficient adjustment to and from the disk to accommodate variations in the size of ears of ordinary field-corn; but heretofore it has been impossible to make the concave approach the disk sufficiently close to shell pop-corn. To provide for this deficiency, I make a concave shell, as 11, of proper external configuration to fit in the operative portion of the concave, flare the upper portion $11^a$ upward and outward to rest in the hopper portion of the concave, extend a point $11^b$ of the flared portion inward beyond the tooth-line on the side of the concave farthest from the center of the disk, extend the lower end of the shell toward the center of the disk, as shown at $11^d$, corrugate the concavity of the shell, as shown at $11^c$, and provide a hole $11^e$. (Seen in Fig. 4 only.)

When it is desired to use the sheller for shelling pop-corn, the shell 11 is inserted into the throat or operative portion of the concave, with the flared part $11^a$ resting in the enlarged hopper portion and the toothed part $11^b$ extending beyond the face of the concave, and a bolt 10 is passed through hole $11^e$ and a coinciding hole in the concave and used to fasten the shell in the concave. The body of the shell approaches the face of the disk sufficiently close to force the ears of pop-corn into contact with the teeth. The flared portion aids in sustaining the shell in position and acts as a guide to direct the ears to the throat of the shell, and the toothed part $11^b$ prevents the corn from being centrifugally displaced by the initial action of the teeth of the disk. The sidewise extension $11^d$ enables the machine to maintain its hold on the diminutive pop-corn cob and turn it upward and sidewise in act of discharging.

What I claim as new, and desire to secure by Letters Patent, is—

The combination with a disk-and-concave sheller, of the concaved shell 11 transversely corrugated and having the flared upper end 11ª, the inward-extended tooth-like part 11ᵇ and the sidewise lower extension 11ᵈ, together with a bolt for securing the shell in the throat of the concave of the sheller, substantially as set forth.

In testimony whereof I sign my name in the presence of two subscribing witnesses.

FELIX B. TAIT.

Attest:
W. R. ESSICK,
EDWARD C. BASSEY.